United States Patent
Jin et al.

(10) Patent No.: US 11,068,493 B2
(45) Date of Patent: Jul. 20, 2021

(54) GUIDED CONTENT DISCOVERY IN VISUAL SEARCH

(71) Applicant: ADOBE INC., San Jose, CA (US)

(72) Inventors: Hailin Jin, San Jose, CA (US); John Collomosse, Pyrford (GB)

(73) Assignee: Adobe Inc., San Jose, CA (US)

( * ) Notice: Subject to any disclaimer, the term of this patent is extended or adjusted under 35 U.S.C. 154(b) by 157 days.

(21) Appl. No.: 16/183,228

(22) Filed: Nov. 7, 2018

(65) Prior Publication Data

US 2020/0142994 A1   May 7, 2020

(51) Int. Cl.
| | |
|---|---|
| G06F 16/248 | (2019.01) |
| G06N 3/08 | (2006.01) |
| G06F 16/51 | (2019.01) |
| G06F 16/28 | (2019.01) |
| G06F 16/532 | (2019.01) |

(52) U.S. Cl.
CPC .......... *G06F 16/248* (2019.01); *G06F 16/287* (2019.01); *G06F 16/51* (2019.01); *G06F 16/532* (2019.01); *G06N 3/08* (2013.01)

(58) Field of Classification Search
CPC ...... G06F 16/248; G06F 16/51; G06F 16/287; G06F 16/532; G06N 3/08
See application file for complete search history.

(56) References Cited

U.S. PATENT DOCUMENTS

| | | | |
|---|---|---|---|
| 2005/0055344 A1* | 3/2005 | Liu | G06F 16/5838 |
| 2015/0379375 A1* | 12/2015 | Wang | G06F 16/5854 |
| | | | 382/203 |
| 2019/0340469 A1* | 11/2019 | Su | G06T 11/60 |

OTHER PUBLICATIONS

Qi, Y., Song, Y. Z., Zhang, H., & Liu, J_ (Sep. 2016). Sketch-based image retrieval via siamese convolutional neural network . In Image Processing (ICIP), 2016 IEEE International Conference on (pp. 2460-2464). IEEE. (Year: 2016).*

Zhu, J_ Y., Lee, Y. J., & Efros, A. A. (2014). AverageExplorer: Interactive exploration and alignment of visual data collections. ACM Transactions on Graphics {TOG), 33(4), 160. (Year: 2014).*

(Continued)

*Primary Examiner* — Mark D Featherstone
*Assistant Examiner* — Kweku William Halm
(74) *Attorney, Agent, or Firm* — Shook, Hardy & Bacon L.L.P.

(57) ABSTRACT

Embodiments of the present invention provide systems, methods, and computer storage media for guided visual search. A visual search query can be represented as a sketch sequence that includes ordering information of the constituent strokes in the sketch. The visual search query can be encoded into a structural search encoding in a common search space by a structural neural network. Indexed visual search results can be identified in the common search space and clustered in an auxiliary semantic space. Sketch suggestions can be identified from a plurality of indexed sketches in the common search space. A sketch suggestion can be identified for each semantic cluster of visual search results and presented with the cluster to guide a user towards relevant content through an iterative search process. Selecting a sketch suggestion as a target sketch can automatically transform the visual search query to the target sketch via adversarial images.

17 Claims, 11 Drawing Sheets

(56) References Cited

OTHER PUBLICATIONS

Kurakin, A., Goodfellow, I., & Bengio, S. (2016). Adversarial examples in the physical world. arXiv preprint arXiv: 1607.02533. 14 pages. (Year: 2016).*

Gordo, A., Almazan, J., Revaud, J., & Larlus, D. (Oct. 2016). Deep image retrieval: Learning global representations for image search. In European Conference on Computer Vision (pp. 241-257). Springer, Cham. (Year: 2016).*

Zhu et al. Average Explorer: Interactive Exploration and Alignment of Visual Data Collections (Year: 2014).*

Kurakin et al. "Adversarial Examples in the Physical World" (Year: 2017).*

Qi et al. "Sketch-Based Th'.IAGE Retrieval via Siamese Convolutional Neural Network" (Year: 2016).*

Gordo et al. "Deep Image Retrieval: ∧ Learning global representations for image search" (Year: 2016).*

Gordo et al., "Deep Image Retrieval: ∧ Learning global representations for image search", pp. 1-21 (Year: 2018).*

Kurakin et al., "Adversarial examples in the physical world", pp. 1-14 (Year: 2017).*

Qi et al., "Sketch-Based Th'.IAGE Retrieval via Siamese Convolutional Neural Network", pp. 1-5 (Year: 2016).*

Zhu et al., "AverageExplorer: Interactive Exploration and Alignment of Visual Data Collections", pp. 1-11, 2014 David G. Lowe, "Distinctive Image Features from Scale-Invariant Keypoints", pp. 1-20, 2004 (Year: 2014).*

Bui, T., & Collomosse, J. (2015). Scalable sketch-based image retrieval using color gradient features. In Proceedings of the IEEE International Conference on Computer Vision Workshops (pp. 1-8).

Bui, T., Ribeiro, L., Ponti, M., & Collomosse, J. (2016). Generalisation and sharing in triplet convnets for sketch based visual search. arXiv preprint arXiv:1611.05301. 9 pages.

Gordo, A., Almazán, J., Revaud, J., & Larlus, D. (Oct. 2016). Deep image retrieval: Learning global representations for image search. In European Conference on Computer Vision (pp. 241-257). Springer, Cham.

Ha, D., & Eck, D. (2017). A neural representation of sketch drawings. arXiv preprint arXiv:1704.03477. 15 pages.

Hu, R., & Collomosse, J. (2013). A performance evaluation of gradient field hog descriptor for sketch based image retrieval. Computer Vision and Image Understanding, 117(7), 790-806.

Jegou, H., Douze, M., & Schmid, C. (2011). Product quantization for nearest neighbor search. IEEE transactions on pattern analysis and machine intelligence, 33(1), 117-128.

Kurakin, A., Goodfellow, I., & Bengio, S. (2016). Adversarial examples in the physical world. arXiv preprint arXiv:1607.02533. 14 pages.

Lee, Y. J., Zitnick, C. L., & Cohen, M. F. (Aug. 2011). Shadowdraw: real-time user guidance for freehand drawing. In ACM Transactions on Graphics (TOG) (vol. 30, No. 4, p. 27). ACM.

Mikolov, T., Sutskever, I., Chen, K., Corrado, G. S., & Dean, J. (2013). Distributed representations of words and phrases and their compositionality. In Advances in neural information processing systems (pp. 3111-3119).

Qi, Y., Song, Y. Z., Zhang, H., & Liu, J. (Sep. 2016). Sketch-based image retrieval via siamese convolutional neural network. In Image Processing (ICIP), 2016 IEEE International Conference on (pp. 2460-2464). IEEE.

Sangkloy, P., Burnell, N., Ham, C., & Hays, J. (2016). The sketchy database: learning to retrieve badly drawn bunnies. ACM Transactions on Graphics (TOG), 35(4), 119.

Wang, F., Kang, L., & Li, Y. (2015). Sketch-based 3d shape retrieval using convolutional neural networks. In Proceedings of the IEEE Conference on Computer Vision and Pattern Recognition (pp. 1875-1883).

Yu, Q., Liu, F., Song, Y. Z., Xiang, T., Hospedales, T. M., & Loy, C. C. (2016). Sketch me that shoe. In Proceedings of the IEEE Conference on Computer Vision and Pattern Recognition (pp. 799-807).

Zhu, J. Y. Lee, Y. J. & Efros, A. A. (2014). AverageExplorer: Interactive exploration and alignment of visual data collections. ACM Transactions on Graphics (TOG), 33(4), 160.

* cited by examiner

GUIDED CONTENT DISCOVERY IN VISUAL SEARCH

BACKGROUND

Visual search is an emerging technology that uses a visual query (e.g., an image, a sketch, a collage, etc.), rather than text keywords, to identify relevant content from large image repositories. Most visual search implementations search for near-duplicates of a particular input to identify similar images. Often, however, users lack a suitable visual example to use as a visual search query. Instead, users may only have a mental impression of a desired image. Accordingly, an emerging class of visual search systems allows users to construct visual queries by sketching or painting in order to communicate search intent. However, many users have limited drawing abilities, and sketched visual search queries are often ambiguous or include incomplete descriptions of the desired visual content. As a result, current visual search techniques often produce low quality search results, and users often experience frustration.

SUMMARY

Embodiments of the present invention are directed to a guided visual search system in which the users work interactively with the system to sketch a visual query. The guided visual search system can iteratively present the user with clusters of visual search results and corresponding sketch suggestions to embellish their query in order to promote content discovery and ultimately guide users toward clusters of relevant content.

In order to provide a guided visual search, neural networks can be used to compare structural information for a visual search query and an indexed dataset of rasterized images, and to cluster matching images based on semantic meaning. In some embodiments, a visual search query (e.g., a sketch) can be encoded into a sketch sequence that represents strokes of the sketch and includes ordering information of the strokes. The sketch sequence can be encoded based on visual structure into a digital representation (a search encoding) in a joint metric space (a structural search space) within which structural information can be compared. A dataset of rasterized images can be indexed for comparison by encoding the images into search encodings in the same structural search space. To facilitate clustering based on semantic meaning, the same dataset of images can also be encoded by another neural network into digital representations (semantic encodings) in a separate metric space based on semantic meaning (an auxiliary semantic space). Visual search results can be identified for the visual search query based on proximity to the query in the structural search space. These search results may be clustered in the structural search space based on structural similarity, but will often include search results of different semantic categories (e.g., mushrooms, umbrellas, street signs, etc.). As such, the visual search results from the structural search space can be clustered in the auxiliary semantic space, and presented as clusters of visual search results.

In some embodiments, sketch suggestions can be presented in association with each cluster of search results. Generally, a sketch suggestion provides guidance to a user to complete an incomplete visual search query in order to help the user evolve the sketch to obtain visual search results from a corresponding cluster. To accomplish this, a dataset of sketches can be indexed in the structural search space. One of the indexed sketches can be identified for a particular cluster by first identifying an indexed sketch for each visual search result in a cluster. More specifically, for each visual search result in a cluster, the closest indexed sketch in the structural search space is identified. Then, from the set of closest indexed sketches, the one indexed sketch that is closest to the visual search query in the structural search space is identified. That indexed sketch can be the sketch identified for the cluster because it represents the least of amount of work a user needs to perform to evolve a partial sketch to obtain the visual search results from the cluster. Multiple clusters and associated sketch suggestions can be presented.

In some embodiments, a user can select one of the sketch suggestions as a target sketch, and the visual search query can be transformed into the target sketch. The transformation can occur instantly or gradually. In some embodiments, a user can indicate a gradual transformation using a slider or some other interaction element. A visual search query can be gradually transformed by generating adversarial images. More specifically, an input indicating a gradual transformation can be interpreted as a linear interpolation in the structural search space. The difference between the visual search query and the target sketch can be interpreted as a network loss and backpropagated to generate an adversarial RNN encoding, and the adversarial RNN encoding can be decoded to generate an adversarial image. This process can be repeated to effect a smooth transition from the visual search query to a target sketch.

As such, the visual search system can provide an interactive process that drives incremental query modifications to help users evolve a sketch to find more relevant and accurate visual search results faster than in prior techniques.

BRIEF DESCRIPTION OF THE DRAWINGS

The present invention is described in detail below with reference to the attached drawing figures, wherein.

DETAILED DESCRIPTION

Overview

Figure 1:
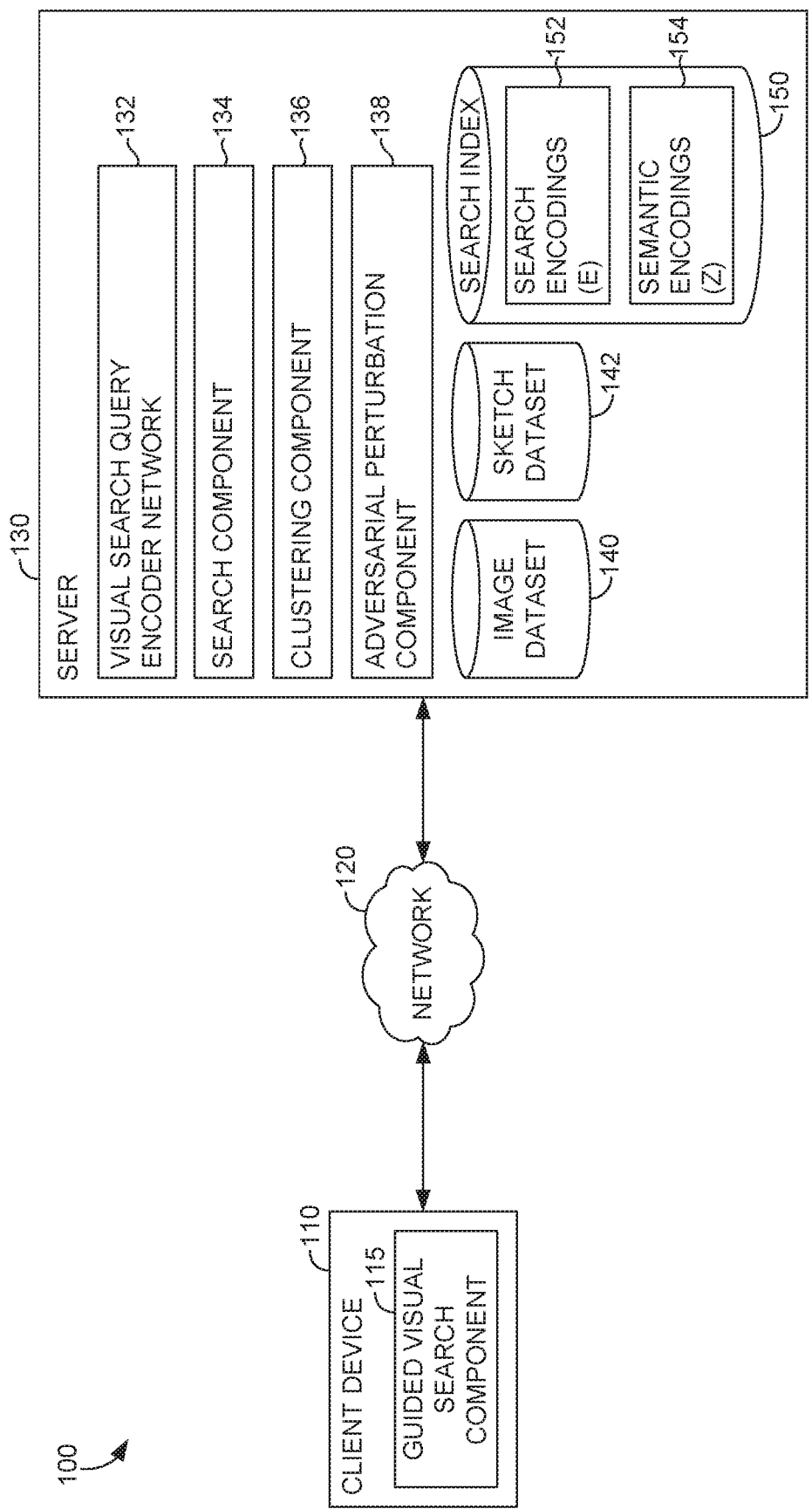
FIG. 1 is a block diagram of an example guided visual search system, in accordance with embodiments of the present invention.

When performing a visual search, a visual example is often unavailable for use as a visual search query. As such, some sketch-based image retrieval (SBIR) techniques allow users to search for images by sketching or painting a visual search query. In SBIR, a visual search query is constructed iteratively from a series of strokes made on a digital canvas. However, many users have limited drawing abilities, and sketched visual search queries often present ambiguous or incomplete descriptions of the desired visual content. As a result, current SBIR techniques often produce low quality search results, and users often experience frustration. Furthermore, most SBIR systems take a sketch to be a one-time query and return results based on the sketch. This often leads to a large set of search results that do not match the search intent.

One prior technique provides sketching assistance by searching for drawings that match an input sketch, blending top search results together, and rendering the resulting "shadow" on top of the input sketch. This shadow can help unskilled users to draw a sketch. However, this technique does not actually provide access to a particular search result, but rather presents a blended shadow of many search results. As a result, the guidance provided by this technique lacks clarity. Furthermore, the shadow operates to suggest blended regions within which a user may draw strokes to complete a sketch. The suggested regions are blended from images that exist in the search database. As a result, the possible suggestions are constrained to existing images in the search database. Hence, this technique lacks an ability to adapt to new information.

A number of prior techniques have applied deep learning, and specifically convolutional neural networks (CNNs), to SBIR and visual search. For example, prior techniques have used CNNs to learn correspondences between sketches and edge maps, and to learn cross-domain transformation functions. More specifically, some prior techniques use deep networks to learn a mapping function that distills a rasterized image into a point in a high-dimensional metric space called an embedding, such that the distance between images in the embedding correlates to similarity. However, since these techniques apply to rasterized sketches, they fail to consider the order in which the drawing's strokes were generated. As a result, these techniques have limited accuracy. Furthermore, these techniques fail to assist the user to form more discriminative visual search queries that lead to higher quality search results.

Some prior techniques manipulate input imagery in order to influence the network. In the context of adversarial visual examples, image pixels are altered to generate training data that changes the classification output of a network. For example, the fast gradient sign method (FGSM) directly backpropagates classification loss to input pixels in order to induce noise that is imperceptible to a human, yet causes a misclassification of content with high confidence. However, since these adversarial examples make changes that are imperceptible to humans, they cannot guide a user to form more discriminative visual search queries.

Accordingly, embodiments of the present invention directed to a guided visual search system in which users work interactively with the system to sketch a visual search query, and the users are iteratively presented with suggestions to embellish their sketch in order to promote content discovery and ultimately guide them towards relevant content more quickly. The guided visual search system facilitates an enhanced form of visual search in which the user communicates their query to the system iteratively through successive updates to the visual search query. The updates may be informed by automated prompts that visually suggest ways in which the user might embellish the visual search query in order to guide the user towards content that is deemed likely to be relevant based upon the current state of the query. In doing so, the system guides the disambiguation of the sketch with respect to available content, reducing the time taken to find relevant content. In some embodiments, the guided visual search system uses deep neural networks (DNNs) for search and for adversarial synthesis of the guidance prompts, which can offer a flexible way to deal with multi-query modalities. For example, the guided visual search system can synthesize a sketch suggestion in vector form, in embodiments in which the visual search query is in vector form. As such, the guided visual search system helps declutter the presentation of the suggestions, and the space for suggested edits need not be constrained to existing images in a dataset.

In some embodiments, a sketch sequence can be taken as a visual search query and used to perform a visual search. The use of a sketch sequence, as opposed to a raster image, results in a conceptually higher-level representation of a visual search query. More specifically, because a sketch sequence includes ordering information of the constituent strokes in the sketch, using the sketch sequence as in input improves the accuracy of visual search systems over prior techniques. Furthermore, and as explained in more detail below, using a sketch sequence as an input can facilitate generation of meaningful suggestions for refining a partial visual search query to guide a user to a desired set of visual search results.

In some embodiments, visual search results can be generated and relayed in clusters of top search results, and each cluster may be presented in association with one or more suggestions for updating the visual search query. In some embodiments, a user may use the clusters of search results and/or the corresponding suggestions to assist the user to form more discriminative visual search queries that lead to higher quality search results. Additionally or alternatively, the user may select one of the clusters and/or suggestions to designate a target sketch, and the guided visual search system can automatically transform the visual search query to the target sketch. As such, the guided visual search system can provide an interactive process that drives incremental query modifications to help users evolve a sketch to find more relevant and accurate visual search results faster than in prior techniques.

In some embodiments, one or more suggestions for updating a visual search query can be generated using adversarial images. For example, one or more selected points in a search space (e.g., along a path from the visual search query to a target sketch) can be identified, and the neural network used to encode into the search space can be reversed to generate corresponding adversarial image(s). Generally, by identifying top clusters of search results that may represent the search intent for a visual search query, the neural network used to generate the search results can be reversed to identify sketches that could generate the clusters.

In one example technique, a recurrent neural network (RNN) encoder can be trained to generate a search encoding from a sketch sequence, a convolutional neural network (CNN) can be trained to generate a search encoding for a rasterized version of the sketch sequence, and a unification network can be trained to transform these into a common search space. An image branch from a trained structure network can be used along with the unification network to index images from a dataset in a search index. A sketch sequence used as visual search query can be fed through the RNN encoder and the unification network to generate a search encoding for the visual search query in the search space. The search index can be searched for the closest matches (e.g., shortest distances) in the search space, and the top n matches can be presented or otherwise made available to the user.

In some embodiments, visual search results can be clustered in an auxiliary semantic space Z. For example, in addition to indexing the image dataset in the search space, the image dataset can be indexed using an auxiliary semantic network to generate semantic encodings in the auxiliary semantic space. Generally, semantic encodings may encode images based on semantic meaning, semantic labels, and/or semantic categories (e.g., umbrella, mushroom, house, etc.). While the search space can cluster results that share a structural similarity, clustering the search results in the semantic space produces clusters with different semantic meanings. Top clusters can be selected for presentation in various ways.

In some other embodiments, a database of sketches can be indexed in the search space. For each search result in a particular cluster of search results in the auxiliary semantic space, a corresponding search encoding in the search space can be used to identify the nearest sketch in the search space. In this example, the cluster(s) that includes a search result with an associated sketch that is closest to the query in the search space can be identified as a top cluster(s). Selecting and presenting clusters that correspond to the closest sketches to the query in the search space results in the least amount of work for the user to complete a partial sketch. Top clusters and/or corresponding closest sketches can be presented in a guided visual search interface to assist the user in forming more discriminative visual search queries that lead to higher quality search results.

In some embodiments, the user may select one of the clusters and/or suggestions to designate a target sketch, and the visual search system can automatically transform the visual search query to the target sketch. Generally, backpropagation can be applied to generate an adversarial RNN encoding, which can be decoded to generate an adversarial image. More specifically, a user input indicating a transition from a query to the target sketch in the search space can be interpreted as a loss in the network, and the loss can be backpropagated through the network to update the position in RNN space. For example, a user input (e.g., button press, slider, etc.) may indicate a desired transformation (e.g., a full or partial transformation) from query to a target sketch. The difference between the query and a desired location in the search space (e.g., along a path from the query to the target sketch) can be interpreted as a loss and backpropagated to update the RNN space and generate a corresponding sketch using an RNN decoder. This process can be repeated any number of times, for example, to effect a smooth transition from a partial sketch to a target sketch. Using this technique can effectively result in a linear interpolation in search space, which yields approximately plausible sketches throughout the transformation from a visual search query to a target sketch.

As such, the guided visual search system can provide an interactive process that drives incremental query modifications to help users evolve a sketch to find more relevant and accurate visual search results faster than in prior techniques.

Having briefly described an overview of aspects of the present invention, various terms used throughout this description are provided. Although more details regarding various terms are provided throughout this description, general descriptions of some terms are included below to provider a clearer understanding of the ideas disclosed herein:

A visual search query generally refers to a visual input to a search engine (e.g., an image, a sketch, a collage, etc.) configured to perform a visual search. For example, a visual search query can be a free hand sketch in vector form, a raster image, a text search phrase encoded in vector form (e.g., using word2vec), and the like.

A sketch sequence generally refers to a representation of strokes of a sketch, and that includes ordering information of the strokes. A sketch sequence can be detected from a series of input strokes and can be encoded in any suitable manner. In one example, a sketch can be represented as a sequence of vectors, with each vector indicating a point in the sketch and one or more corresponding states identifying the point's relationship to a particular stroke and/or to the sketch (e.g., beginning of stroke, end of stroke, beginning of sketch, end of sketch, etc.).

A search encoding, as used herein, refers to a digital representation of a visual input in a joint metric space. Generally, search encodings may encode based on the shape or structure of a visual input. For example, different braches of a triplet network can be trained to encode different types of visual inputs (e.g., sketches, sketch sequences, rasterized images, etc.) into vectors in a common search space for comparison. By indexing a database of visual inputs into the common search space, a visual search query can be encoded into a search encoding (e.g., a structural search encoding), and the closest indexed images (i.e., nearest search encodings in the common search space) can be identified.

A semantic encoding, as used herein, refers to a digital representation of a visual input in a semantic space. Generally, semantic encodings may encode based on semantic meaning, semantic labels, and/or semantic categories (e.g., umbrella, mushroom, house, etc.). For example, a semantic network can be trained to encode different types of visual inputs (e.g., a sketch, a sketch sequence, a rasterized image, etc.) into vectors in an auxiliary semantic space. By indexing a database of visual inputs into a search space and an auxiliary semantic space, search results in the search space can be clustered in the auxiliary semantic space to identify different clusters of search results with different semantic meanings.

A fused triplet network generally refers to a neural network with branches that have been separately trained and combined. Generally, a triplet network refers to a neural network with three branches (e.g., an anchor branch in a sketch domain, and positive and negative branches in an image domain). In this example, the anchor branch may be separately trained from the branches in the image domain, and the branches can be fused together to form a triplet network. In some embodiments, the branches can be fused together via a unification network trained to generate encodings in a common search space from the outputs of the different branches.

Example Guided Visual Search Environment

Referring now to FIG. 1, a block diagram of exemplary environment 100 suitable for use in implementing embodiments of the invention is shown. Generally, environment 100 is suitable for facilitating a guided visual search, and, among other things, facilitates incremental query modifications for a visual search query. Environment 100 includes client device 110, server 130, and network 120. In the embodiment illustrated in FIG. 1, client device 110 includes a guided visual search component 115. Generally, the guided visual search component 115 iteratively presents suggestions for updates to a visual search query and can facilitate a transformation of the visual search query to a target sketch. Client device 110 can be any kind of computing device capable of facilitating a guided visual search. For example, in an embodiment, client device 110 can be a computing device such as computing device 1100, as described below with reference to FIG. 11. In embodiments, client device 110 can be a personal computer (PC), a laptop computer, a workstation, a mobile computing device, a PDA, a cell phone, or the like. The components of environment 100 may communicate with each other via network 120, which may include, without limitation, one or more local area networks (LANs) and/or wide area networks (WANs). Such networking environments are commonplace in offices, enterprise-wide computer networks, intranets, and the Internet.

In FIG. 1, client device 110 includes guided visual search component 115. The guided visual search component 115 may be incorporated, or integrated, into an application or an add-on or plug-in to an application. The application may generally be any application capable of facilitating a guided visual search, and may be a stand-alone application, a mobile application, a web application, or the like. In some implementations, the application comprises a web application, which can run in a web browser, and could be hosted at least partially server-side. In addition, or instead, the application can comprise a dedicated application. In some cases, the application can be integrated into the operating system (e.g., as a service). Although generally discussed herein as guided visual search component 115 being associated with an application, in some cases, guided visual search component 115, or a portion thereof, can be additionally or alternatively integrated into the operating system (e.g., as a service) or a server (e.g., a remote server).

The guided visual search component 115 of client device 110 may include a user interface or application allowing the user to submit a visual search query. Any suitable user interface and input component may be used, such as those described with respect to I/O components 1120 of FIG. 11. Various types of visual search queries are possible. For example, the guided visual search component 115 can accept a free hand sketch in vector form, a raster image, a text search phrase encoded visually, and the like. In some embodiments, the guided visual search component 115 accepts a sketch sequence as a visual search query. A sketch sequence generally refers to a representation of strokes of a sketch that includes ordering information of the strokes. A sketch sequence can be detected from a series of input strokes and can be encoded in any suitable manner. In one example, a sketch can be represented as a sequence of vectors, with each vector indicating a point in the sketch and one or more corresponding states identifying the point's relationship to a particular stroke and/or to the sketch (e.g., beginning of stroke, end of stroke, beginning of sketch, end of sketch, etc.). Further, the sequence can be represented by the order of the points. Generally, the guided visual search component 115 is in communication with server 130 via network 120, and may send the visual search query from client device 110 to server 130 for processing. Although the visual search query is described as being sent to server 130, this need not be the case, as any or all of the components of server 130 may be located on the client device 110 or elsewhere.

In the embodiment illustrated in FIG. 1, server 130 includes visual search query encoder network 132, search component 134, clustering component 136, adversarial perturbation component 138, search index 150 having search encodings 152 and semantic encodings 154, image dataset 140, and sketch dataset 142. Generally, visual search query encoder network 132 encodes a visual search query such as a sketch sequence into a search encoding in a common search space (E). Rasterized images stored in image dataset 140 can be encoded into the same search space (E) and saved as search encodings 152 in search index 150. As such, search component 134 can search the search index 150 for visual search results with search encodings 152 that match an encoded visual search query (e.g., based on proximity to the search encoding for the visual search query in the search space (E)). One or more of the visual search results can be transmitted to client device 110 and presented via guided visual search component 115.

In some embodiments, the images in image dataset 140 can also be encoded into an auxiliary semantic space (Z) and saved as semantic encodings 154 in search index 150. As such, clustering component 136 can cluster the visual search results from (E) in the auxiliary semantic space (Z). As explained in more detail below, one or more of the clusters of visual search results can be transmitted to client device 110 and presented via guided visual search component 115.

In some embodiments, sketches and/or sketch sequences stored in sketch dataset 142 (collectively, indexed sketches) can be encoded into the search space (E) and indexed as search encodings 152 in search index 150. As such, search index 150 can be searched (e.g., by search component 134, clustering component 136, or otherwise) to identify one or more of the indexed sketches that match an encoded visual search query (e.g., based on proximity to the search encoding for the visual search query in the search space (E), based on proximity to one of the visual search results in (E), etc.). Matching sketches and/or sketch sequences can be transmitted to client device 110 and presented via guided visual search component 115 as a suggestion to update the visual search query.

In embodiments where the visual search query is a sketch or sketch sequence, guided visual search component 115 can accept a selection of a sketch suggestion as a target sketch, and the visual search query can be automatically transformed into the target sketch. For example, an interaction element (e.g., button, slider, etc.) can be provided that allows a user to designate a target sketch, and automatically transform the visual search query (e.g., a partial sketch) into the target sketch, or into an adversarial image between the visual search query and the target sketch. In some embodiments, a user input can indicate a gradual transformation (e.g., based on a button press, a changing user input such as a slider, etc.), and adversarial perturbation component 138 can gradually transform the visual search query to the target sketch (e.g., through a plurality of adversarial images). As explained in more detail below, a backpropagation can be applied to generate an adversarial RNN encoding, which can be decoded to generate an adversarial image that updates the input sketch. This process can be repeated any number of times, for example, to effect a smooth transition from a partial sketch to a target sketch.

Generally, visual search query encoder network 132 is a neural network trained to encode a sketch sequence and an associated rasterized image into a common search space (E).

Figure 5:
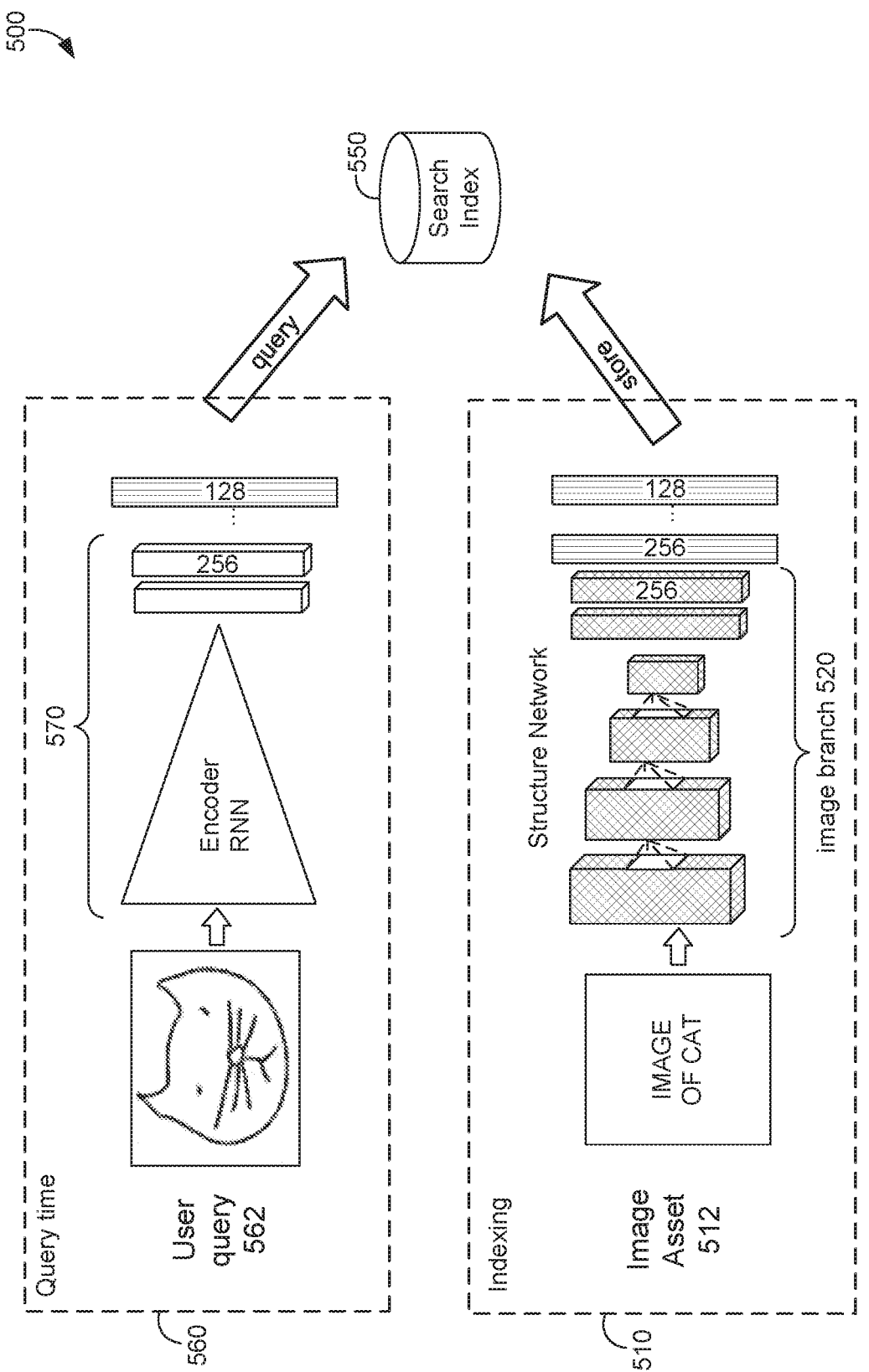
FIG. 5 illustrates an example triplet structure network that can be used during indexing, in accordance with embodiments of the present invention.
Figure 6:
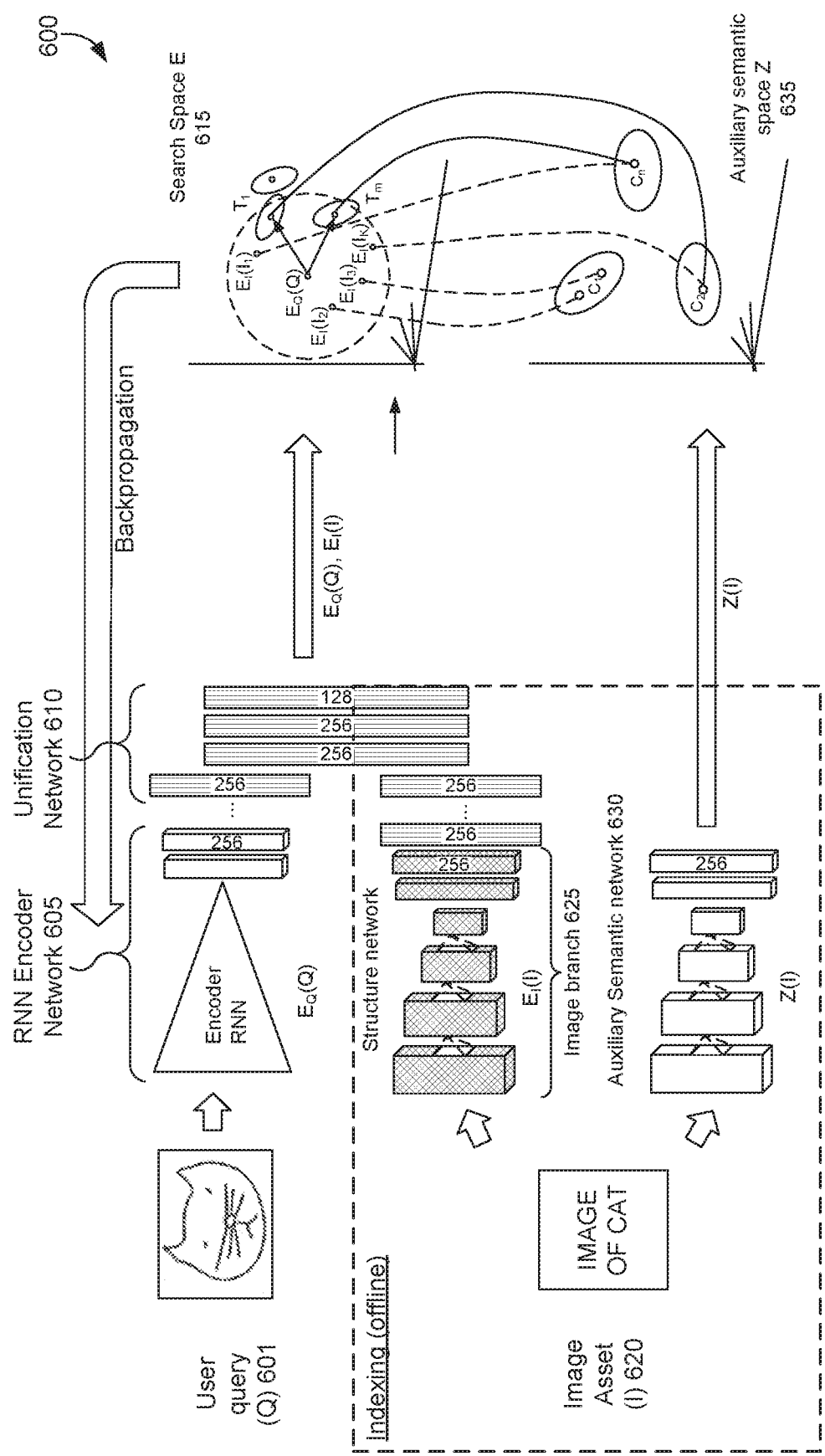
FIG. 6 illustrates an example guided visual search system, in accordance with embodiments of the present invention.

More specifically, visual search query encoder network 132 may be a triplet network with an anchor branch in the sketch domain and positive and negative branches in the image domain. The anchor branch may be an RNN encoder that accepts vector representations of a sketch sequence and encodes the sketch sequence into an encoding in the sketch domain. The positive and negative branches may be a convolutional neural network (CNN) used to train visual search query encoder network 132, as explained in more detail below. For example, the positive branch can accept a rasterized version of a sketch sequence input into the anchor branch and can encode the rasterized sketch sequence into an encoding in the image domain. The negative branch can accept a rasterized negative example and can encode the rasterized negative example into an encoding in the image domain. The visual search query encoder network 132 may include a unification network trained to unify the encodings from the RNN (sketch domain) and the CNN (image domain) into a search encoding in a search space (E). In connection with the discussion that follows, FIGS. 2-4 and the accompanying discussion involve example techniques for building and training a visual search query encoder network. FIG. 5 and the accompanying discussion involve an example indexing technique using a visual search query encoder network. FIG. 6 and the accompanying discussion involve an example visual search query encoder network at search time. Note that to facilitate comparison, similar components in FIGS. 3-6 have been depicted with similar shading.

Generally, visual search query encoder network 132 of server 130 can be trained using a multi-stage training process. At a first stage, a variational autoencoder can be trained to encode and decode a sketch sequence. At a second stage, a triplet structure network can be pre-trained to encode a rasterized sketch and a corresponding positive image into a common space. At a third stage, a fused triplet network can be formed by fusing the RNN encoder network of the variational autoencoder with the pre-trained structure network and combining branches with a unification network. The fused triplet network can be trained such that the unification network learns a transformation function that maps the outputs from each of the three branches into a common search space.

Figure 2:
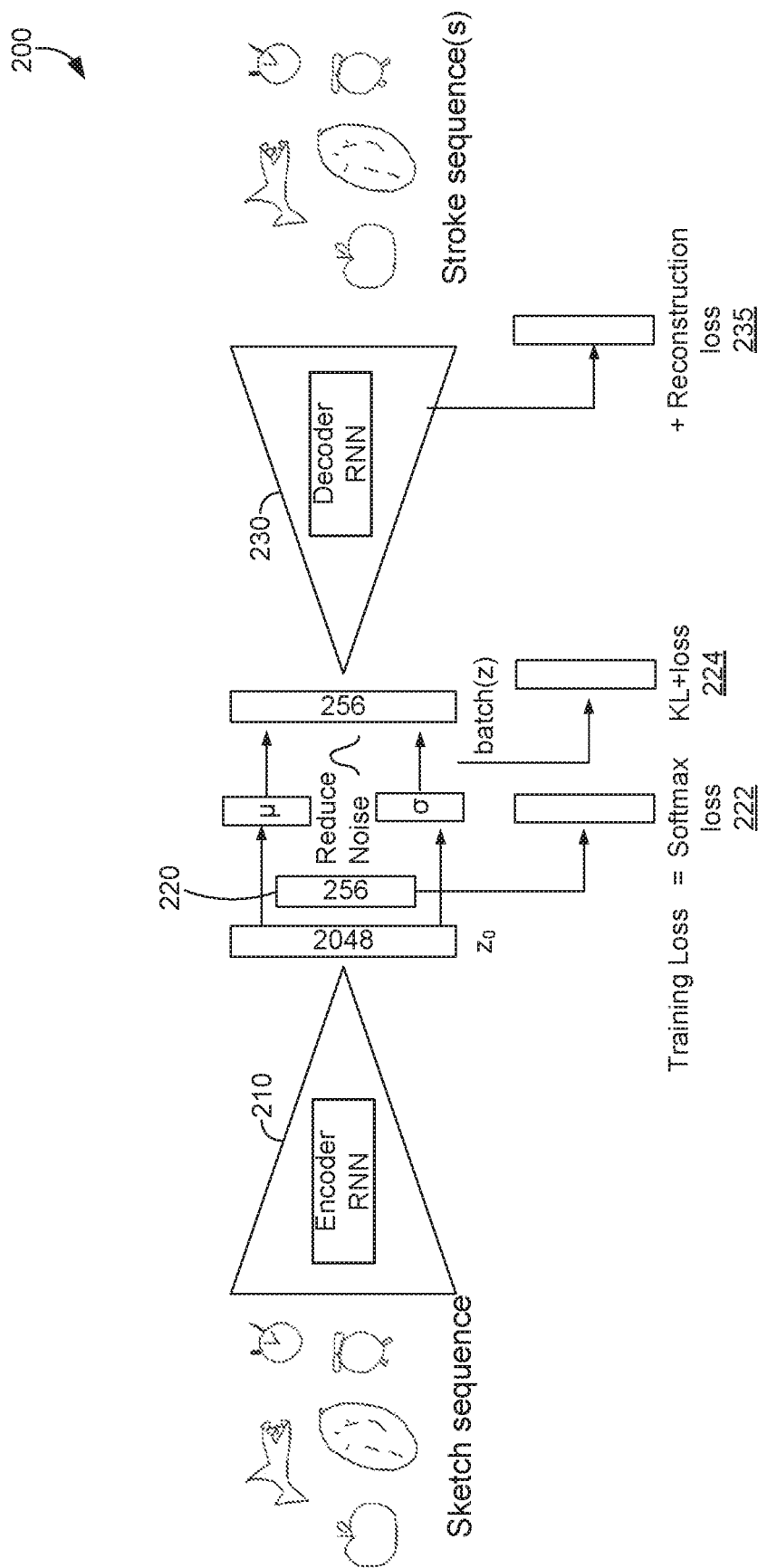
FIG. 2 illustrates an example variational autoencoder, in accordance with embodiments of the present invention.

Turning now to FIG. 2, FIG. 2 depicts example variational autoencoder 200, in accordance with embodiments of the present invention. Variational autoencoder 200 includes RNN encoder 210 and RNN decoder 230. At a high level, an RNN encoder can be generalized across any number of object classes. For example, an RNN encoder network can be formed with RNN encoder 210 and bottleneck layer 220. Generally, bottleneck layer 220 is configured to generate a deterministic search encoding. In the embodiment illustrated in FIG. 2, RNN encoder 210 is configured to accept a sketch sequence. The RNN encoder network can be trained to generate an encoding for any of the object classes by minimizing the loss function of variational autoencoder 200. For example, the loss function can combine softmax loss 222 from bottleneck layer 220, classification loss 224 from variational autoencoder 200, and/or reconstruction loss 235 from RNN decoder 230. In this manner, an RNN encoder can be trained to encode, and an RNN decoder can be trained to decode, a sketch sequence in any number of object classes. Note that although variational autoencoder 200 is depicted with layers of a particular dimensionality (e.g., bottleneck layer 220 is depicted as generating a 256-dimensional search encoding), this particular architecture is simply an example. Any suitable variation on the network architecture may be implemented.

Figure 3:
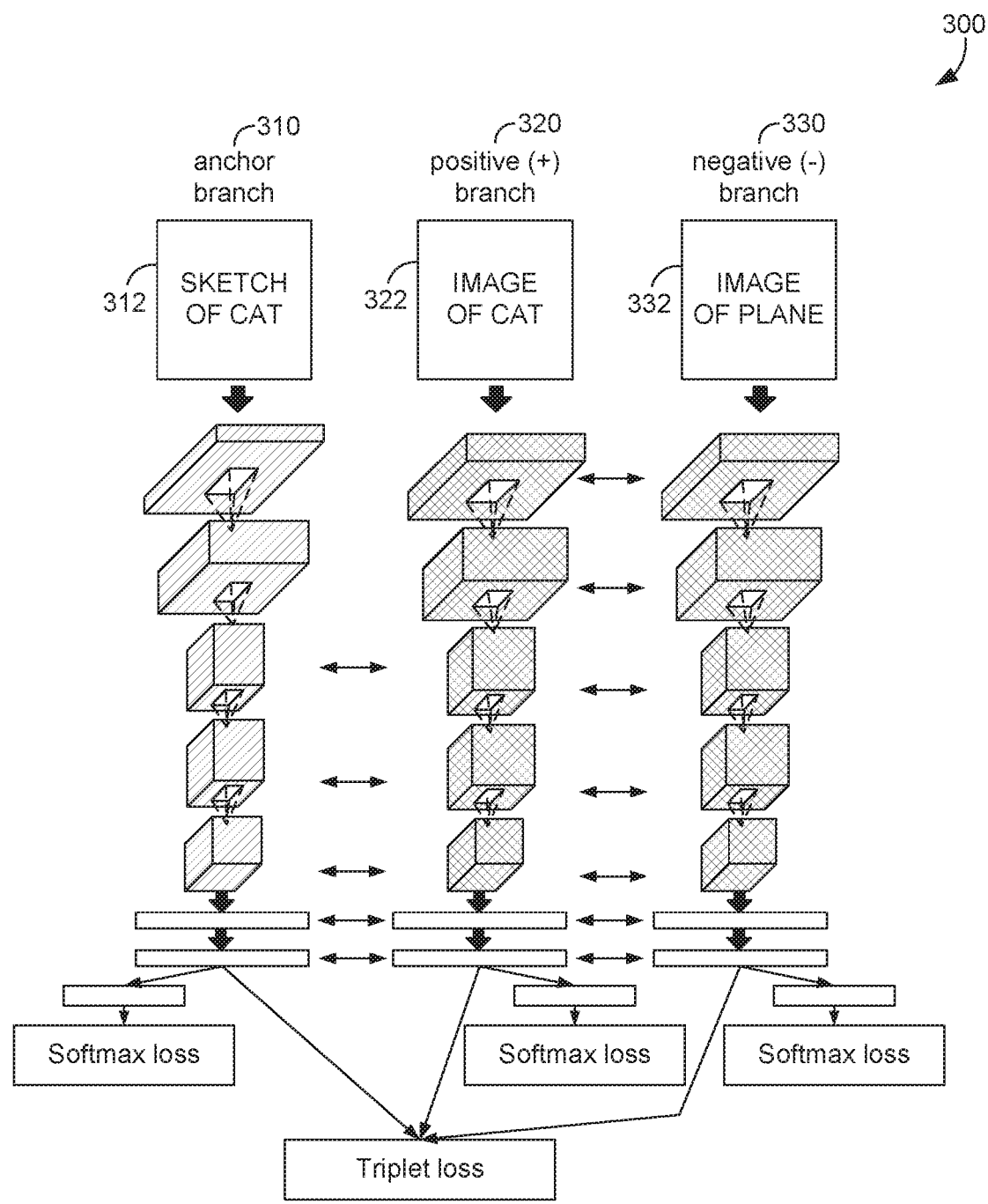
FIG. 3 illustrates a prior triplet structure network.

Turning now to FIG. 3, FIG. 3 illustrates a prior triplet structure network 300. Generally, triplet structure network 300 comprises a CNN that can be trained to encode a rasterized sketch (e.g., a sketch of a cat) and a corresponding positive image (e.g., an image a cat) into a search encoding in a common search space. Triplet structure network 300 includes three branches: anchor branch 310, positive branch 320, and negative branch 330. In the sketch domain, anchor branch 310 accepts rasterized sketch 312. In the image domain, positive branch 320 accepts positive example image 322 and negative branch 330 accepts negative example image 332. Anchor branch 310 may be separately trained from the branches in the image domain (i.e., positive branch 320 and negative branch 330), and the branches can be fused together to form triplet structure network 300. Note that triplet structure network 300 is depicted with a particular number layers by example only. Any suitable variation on the network architecture may be implemented.

Triplet structure network 300 partially shares weights among anchor branch 310, positive branch 320, and negative branch 330. As such, triplet structure network 300 can be trained to learn two encoding functions: one in the sketch domain that generates an encoding from rasterized sketch 312, and one in the image domain that generates an encoding from corresponding positive example image 322. More specifically, triplet structure network 300 can be trained using rasterized inputs (e.g., rasterized sketch 312 and positive example image 322) that are similar in structure, and rasterized inputs (e.g., rasterized sketch 312 and negative example image 332) that are not similar in structure. The selection of triplets (e.g., rasterized sketch 312, positive example image 322, and negative example image 332) may be automated using any known SBIR system to find relevant positive and negative images for a given rasterized sketch, and random sampling for negative examples. Triplet structure network 300 can be trained to generate encodings that converge anchor branch 310 and positive branch 320, and diverge anchor branch 310 and negative branch 330. As such, triplet structure network 300 can be pre-trained to encode a rasterized sketch and a corresponding positive image into a common space.

Figure 4:
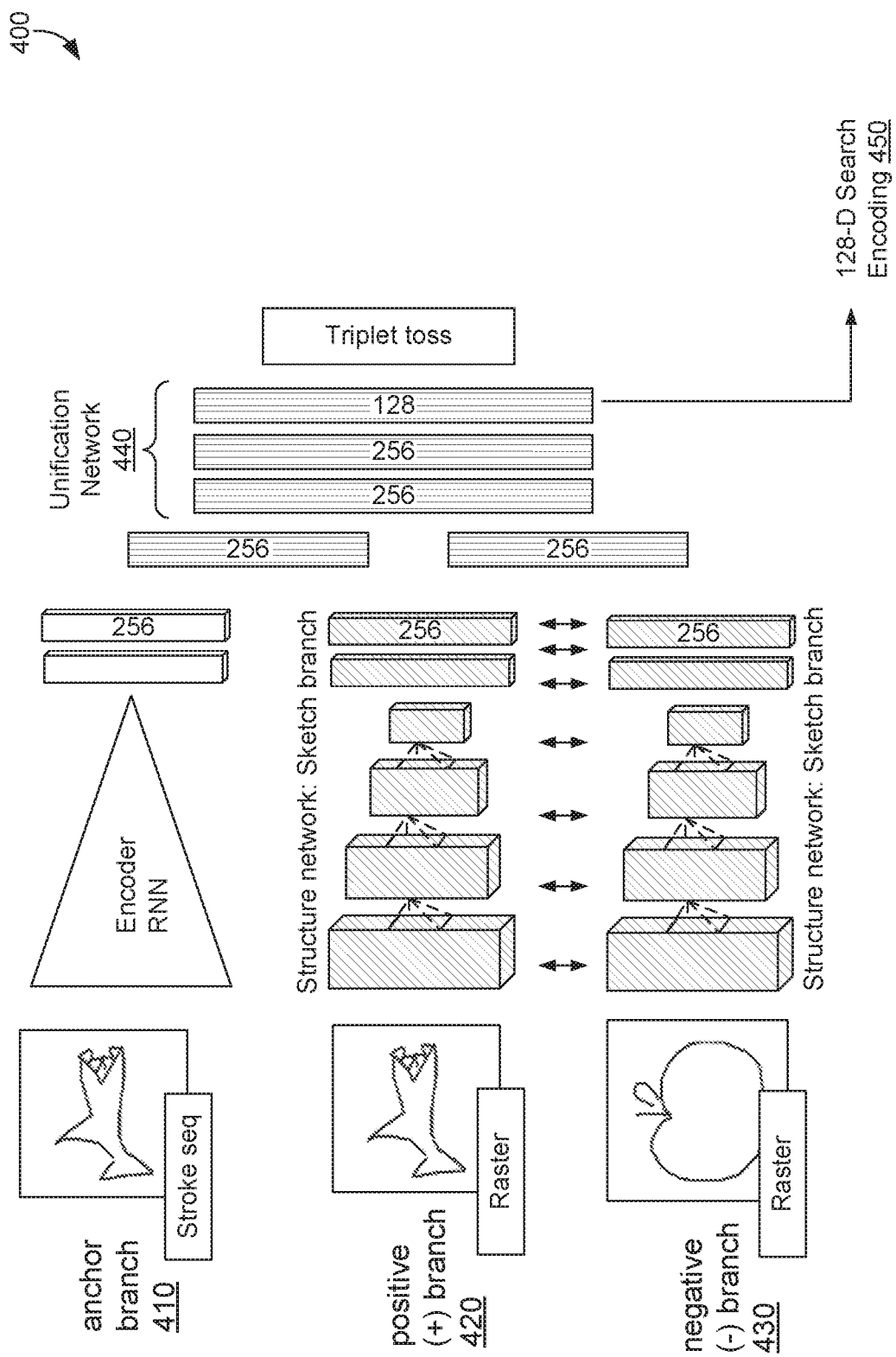
FIG. 4 illustrates an example fused triplet network that can be used for training, in accordance with embodiments of the present invention.

Turning to FIG. 4, FIG. 4 illustrates an example fused triplet network that can be used for training, in accordance with embodiments of the present invention. Generally, a pre-trained RNN encoder and a pre-trained structure network can be fused together and combined with a unification network to form a fused triplet network such as fused triplet network 400 of FIG. 4, and the fused triplet network can be trained to combine a sketch sequence and a corresponding rasterized sketch into the same search space. More specifically, an RNN encoder (e.g., the RNN encoder network described above with respect to FIG. 2) can used as the anchor branch of the fused triplet network (e.g., anchor branch 410 of FIG. 4). Copies of the anchor branch from the pre-trained structure network (e.g., anchor branch 310 of FIG. 3, which accepts a rasterized sketch) can be used for the positive and negative branches of the fused triplet network (e.g., positive branch 420 and negative branch 430 of FIG. 4). As such, anchor branch 310 in FIG. 3 is shaded similarly as positive and negative branches 420 & 430 in FIG. 4 to illustrate use of copies of anchor branch 310 as positive and negative branches 420 & 430. Anchor branch 410, positive branch 420, and negative branch 430 be connected with a unification network (e.g., unification network 440).

Generally, anchor branch 410 of fused triplet network 400 includes an RNN encoder configured to accept a sketch sequence as an input and encode the sketch sequence into the sketch domain. Positive branch 420 includes a CNN configured to encode a rasterized version of the sketch sequence into an image domain. Negative branch 430 includes a CNN configured to encode a rasterized negative example into the image domain.

A unification network can be trained to unify the encodings from the RNN (sketch domain) and the CNN (image domain). For example, the RNN can be trained to encode a sketch sequence, and the CNN can be trained to encode a rasterized version of the sketch sequence. The unification network accepts outputs from those networks and learns how to transform them into a common search space E. In this manner, a sketch of a shark, for example, and a picture of the shark should map to the same point in the search space E.

In the example illustrated in FIG. 4, unification network 440 can be trained to unify the encodings from anchor branch 410, positive branch 420, and negative branch 430. For example, fused triplet network 400 can be trained by pushing a sketch sequence down anchor branch 410, pushing a rasterized version of the sketch sequence down positive branch 420, and pushing a negative example down negative branch 430. In some embodiments, training fused triplet network 400 may progressively increase in complexity by initially using inter-class examples, and may then be fine-tuned using intra-class examples, which are more difficult to distinguish. In this manner, unification network 440 learns how to combine a sketch sequence and a corresponding rasterized sketch into the same search encoding 450. Although unification network 440 is depicted with four layers that output a 128-dimensional search encoding, this particular architecture is simply an example. Similarly, the dimensionality of the anchor, positive, and negative branches of fused triplet network 400 are also meant only as an example. Any suitable variation of the network architecture may be implemented.

Turning now to FIG. 5, FIG. 5 illustrates an example triplet structure network that can be used during indexing, in accordance with embodiments of the present invention. Generally, an image database (e.g., image dataset 140 of FIG. 1) can be indexed for searching using an adapted fused triplet network (e.g., adapted fused triplet network 500). Adapted fused triplet network 500 can be formed by modifying fused triplet network 400 of FIG. 4, and more specifically, by replacing the positive and negative branches (i.e., the image branch) of fused triplet network 400 (which previously held copies of anchor branch 310 of pre-trained triplet structure network 300 of FIG. 3) with positive and negative branches 320 and 330 (i.e., the image branch) of pre-trained triplet structure network 300. To illustrate this configuration, positive and negative branches 320 and 330 in FIG. 3 are shaded similarly as image branch 520 in FIG. 5 and the corresponding portion of FIG. 6. Using this configuration, the output of image branch 520 in adapted fused triplet network 500 feeds into the portion of the unification network that was previously fed by the copies of the anchor branch of the pre-trained structure network. In FIG. 5, the combination of image branch 520 and the unification network is illustrated as indexing network 510. Similarly, the combination of anchor branch 570 and the unification network is illustrated as query network 560. To illustrate, the unification network is shaded similarly in FIGS. 4, 5, and 6.

The motivation for this configuration is that, during training, unification network 440 of fused triplet network 400 of FIG. 4 learned how to map two specific modalities into the same search encoding. During training, the different modalities were a sketch sequence and a rasterized version of the sketch sequence (i.e., an image of the sketch). Hence, fused triplet network 400 was trained to map a sketch sequence and a rasterized version of the sketch into the same search encoding. By substituting the portion of triplet structure network 300 that resides in the image branch of fused triplet network 400 from anchor branch 310 of triplet structure network 300 to the image branch of triplet structure network 300, fused triplet network 400 can be adapted into an adapted fused triplet network 500 that maps a sketch and a corresponding photograph to the same search encoding. Note that the architecture (e.g., layers, dimensionality, etc.) of adapted fused triplet network 500 is meant simply an example. Any suitable variation of the network architecture may be implemented.

As such, adapted fused triplet network 500 can be used to encode a dataset of images (e.g., image dataset 140 of FIG. 1). By feeding images from the dataset of images (e.g., image asset 512) through indexing network 510 of adapted fused triplet network 500, adapted fused triplet network 500 can encode the images into search encodings in the search space E. These search encodings can be saved in search index 550 for subsequent use. During operation, a sketch sequence used as a visual search query (e.g., user query 562) can be fed into anchor branch 570 (sketch domain) of adapted fused triplet network 500 to generate a search encoding of the visual search query (Q) in E. As such, search index 550 can be searched for the closest matches (e.g., indexed images nearest to Q in E), and the top n matches can be presented or otherwise made available.

Turning now to FIG. 6, FIG. 6 illustrates example guided visual search system 600, in accordance with embodiments of the present invention. In the embodiment illustrated in FIG. 6, guided visual search system 600 includes RNN encoder network 605 (which may correspond with the RNN encoder network described in connection with FIG. 2), image branch 625 (which may correspond with image branch 520 of FIG. 5), unification network 610 (which may correspond with unification network 440 of FIG. 4), and auxiliary semantic network 630. Generally, an image dataset (e.g., image asset 620) can be encoded into search space E 615 using image branch 625, and the image dataset can be encoded into auxiliary semantic space Z 635 using auxiliary semantic network 630. In operation, RNN encoder network 605 and unification network 610 can encode user query 601 (Q) (e.g., a sketch sequence) into search space E 615 as $E_Q(Q)$. Matching visual search results (e.g., $E_I(I_{1-k})$) can be identified (e.g., based on proximity to $E_Q(Q)$ in E). Search results in E can be clustered in Z (e.g., $C_{1-n}$), and one or more clusters can be presented as visual search results. Note that the architecture (e.g., layers, dimensionality, etc.) of guided visual search system 600 is meant simply an example. Any suitable variation of the network architecture may be implemented.

Generally, guided visual search system 600 may be configured to generate semantic encodings in an auxiliary semantic space Z using an auxiliary semantic network. In the example depicted in FIG. 6, images in an image dataset (e.g., image asset 620) may be encoded into semantic encodings in auxiliary semantic space Z 635 using auxiliary semantic network 630. Generally, a semantic encoding refers to an encoding of a visual input in a semantic space. For example, semantic encodings may encode images based on semantic meaning, semantic labels, and/or semantic categories (e.g., umbrella, mushroom, house, etc.). In this manner, auxiliary semantic network 630 can be trained to encode different types of visual inputs (e.g., a sketch, a sketch sequence, a rasterized image, etc.) into vectors in auxiliary semantic space Z 635. By indexing a database of visual inputs into search space E 615 and auxiliary semantic space Z 635, search results in search space E 615 can be clustered in auxiliary semantic space Z 635 to identify different clusters of search results with different semantic meanings.

When a user inputs a visual search query (e.g., Q), guided visual search system 600 generates an encoding $E_Q(Q)$ in search space E and can identify visual search results. More specifically, guided visual search system 600 (e.g., search component 134 of FIG. 1) can identify visual search results in E based on proximity to $E_Q(Q)$ in E (e.g., closest to $E_Q(Q)$ in E). A pre-defined number of matching visual search results (e.g., closest/nearest neighbors) may be identified as initial search results $(E_I(I_1)-E_I(I_k))$ in search space E 615. The matching visual search results may be identified based on a distance calculated via any known means, such as product quantization. The visual search results (e.g., nearest neighbors) may be ranked based on proximity to $E_Q(Q)$ in search space E 615. These visual search results should be the most similar indexed search results in shape or structure to the visual search query. Because these points are the closest search results, they will tend to be clustered together in the search space E. However, the corresponding semantic encodings in the auxiliary semantic space Z will not be. As such, corresponding semantic encodings for those search results can be clustered in Z to identify different clusters of search results with different semantic meanings.

In some embodiments, guided visual search system 600 (e.g., via clustering component 136 of server 130) can identify clusters of search results and corresponding indexed sketches for presentation to the user. For example, clustering component 136 may be configured to receive ranked visual search results in E and cluster the visual search results in the auxiliary semantic space Z 635. While the visual search results may be clustered together in search space E 615 based on their structural similarity to the visual search query, they may actually comprise different semantic clusters in auxiliary semantic space Z 635. As such, corresponding semantic encodings in auxiliary semantic space Z 635 for each of the visual search results may be identified using an index that maintains search encodings in E and corresponding semantic encodings in Z. In this manner, one or more semantic clusters $(C_1-C_n)$ may be identified in Z with different semantic meanings.

Generally, top clusters of the semantic clusters $(C_1-C_n)$ can be presented in guided visual search component 115 of client device 110 to assist the user to form more discriminative visual search queries that lead to higher quality search results. The top semantic clusters can be selected in any number of ways. In one example, a database of sketches (e.g., provided by QUICK, DRAW!) can be indexed in search space E 615. Generally, a cluster may be modelled using any conventional technique (e.g., as a Gaussian distribution). For each search result in a particular semantic cluster in auxiliary semantic space Z 135 (e.g., all images within a threshold distance of the cluster such as the Mahalanobis distance), a corresponding search encoding in search space E 615 can be used to identify the nearest sketch to $E_Q(Q)$ in search space E 615. In this example, the cluster that includes a search result with an associated sketch that is closest to the visual search query in search space E 615 can be identified as a top cluster. Selecting semantic clusters that correspond to the closest sketches in search space E 615 to the visual search query $E_Q(Q)$ results in the least amount of work for the user to complete a partial sketch. However, any suitable technique for identifying top semantic clusters may be implemented (e.g., based on cluster size, median distance to $E_Q(Q)$ in search space E 615, etc.).

Guided visual search system 600 can cause the presentation (e.g., via the guided visual search component 115 of client device 110 in FIG. 1) of the top n clusters (e.g., 3) and/or corresponding indexed sketches as suggestions to assist the user to complete a sketch. Since guided visual search system 600 is capable of accepting an incomplete sketch as a visual search query, by presenting top semantic clusters of search results from the search database and/or corresponding indexed sketches, the user is able to use a desired semantic cluster to guide the creation of the rest of the sketch.

Figure 7:
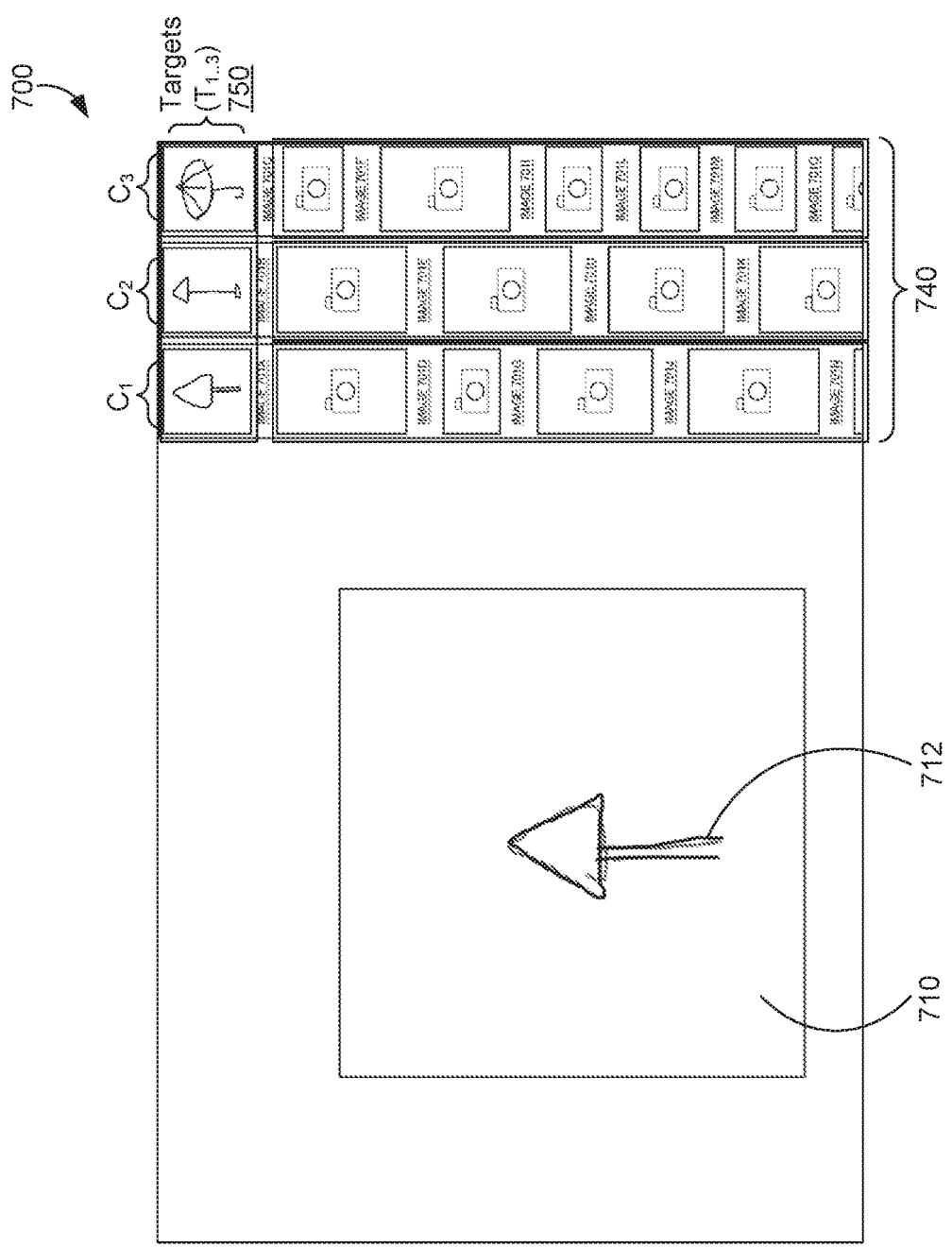
FIG. 7 illustrates an example guided visual search interface, in accordance with embodiments of the present invention.

Turning now to FIG. 7, FIG. 7 illustrates example guided visual search interface 700, in accordance with embodiments of the present invention. Generally, guided visual search interface 700 may present semantic clusters and/or corresponding indexed sketches to a user. For example, guided visual search interface 700 can include input window 710 that accepts a user input designating a visual search query. In the example illustrated in FIG. 7, the user has drawn a mushroom sketch as visual search query 712. Top semantic clusters (i.e., $C_1$, $C_2$, and $C_3$) 740 can be presented, and indexed sketches corresponding to each semantic cluster can be presented as target sketches $(T_1 \ldots _3)$ 750.

By clustering possible visual search results in the auxiliary semantic space Z, the system identifies several distinct ways in which a visual search query may evolve through user interaction with the system. This improves clarity of the guidance provided to the user as well as broadening of the scope of user sketch results outside of the image and sketch datasets. For example, cluster $C_1$ and corresponding images 701A, 701D, 701G, 701J, and 701N correspond to a cluster of visual search results depicting images of mushrooms. Cluster $C_2$ and corresponding images 701B, 701E, 701H, and 701K correspond to a cluster of visual search results depicting images of street signs. Cluster $C_3$ and corresponding images 701C, 701F, 701H, 701L, 701M, and 701O correspond to a cluster of visual search results depicting images of umbrellas. By presenting these clusters of visual search results and a corresponding target sketch 750, the user can evolve a partial sketch to adapt to a desired semantic cluster.

In some embodiments, the user may select one of the clusters and/or target sketches 750 to designate a target sketch, and the guided visual search system can automatically transform visual search query 712 to the target sketch. For example, an interaction element (e.g., button, slider, etc.) can be provided that allows a user to designate a target sketch, and automatically transform the visual search query (e.g., a partial sketch) into the target sketch, or into an adversarial image between the visual search query and the target sketch (e.g., through a plurality of adversarial images). In some embodiments, backpropagation can be applied to generate an adversarial RNN encoding, which can be decoded to generate a transformed visual search query. More specifically, a user input indicating a transition from a visual search query to a desired location in the search space E (e.g., the target sketch, a location along a path from the query to the target sketch, etc.) can be interpreted as a loss in the network (e.g., unification network 610 in FIG. 6), and the loss can be backpropagated through the network to update the position in RNN space.

In some embodiments, interpolation can be used to generate a transformed visual search query. More specifically, knowing where a query $E_Q(Q)$ is in E and where a selected target sketch $E_Q(T)$ is in E, each of these points can be converted to an encoding in RNN space, and interpolation may be used to generate a point that moves through the RNN space over time. Generally, this RNN space is generative because any point in RNN space can be pushed through a corresponding RNN decoder (e.g., of a variational autoencoder that pairs the RNN encoder with an RNN decoder). As such, an RNN decoder (e.g., RNN decoder 230 of FIG. 2) can be used to generate a transformed visual search query. Using the point in RNN space, a transformation can be applied that moves the point through RNN space (e.g., step transition, gradual transformation over a pre-determined time, based on a changing user input such as a slider, etc.) to transform the visual search query to the target sketch T.

In some embodiments, the quality of a transformed visual search query can be improved by, instead of walking linearly through the RNN space, walking through the search space E and applying a backpropagation to generate an adversarial RNN encoding in RNN space. More specifically, a user input indicating a transition from visual search query to a desired location in the search space E (e.g., the target sketch, a location designated by a user input such as a slider corresponding to a path from the query to the target sketch, etc.) can be interpreted as a loss in the network (e.g., unification network 610 of FIG. 6), and the loss can be backpropagated through the network to update the position in RNN space. For example, a non-linear path can be generated in RNN space by moving linearly in search space E 715 and backpropagating changes to RNN space that will produce the corresponding change in search space E 715. For example, a user input (e.g., button press, slider, etc.) may indicate a desired transformation from $E_Q(Q)-E_Q(T)$, or along a path from $E_Q(Q)-E_Q(T)$, in search space E 715. The difference between the query and the designated location in search space (e.g., $|E_Q(Q)-E_Q(T)|$) can be interpreted as a loss and backpropagated to update the RNN space and generate a corresponding adversarial image using an RNN decoder (e.g., RNN decoder 230 of FIG. 2). This process can be repeated any number of times, for example, to effect a smooth transition from a partial sketch to a target sketch. Performing a linear interpolation in search space E should yield approximately plausible sketches.

Generally, the foregoing process can facilitate guided incremental query modifications towards likely concentrations of relevant content in the indexed collection. By adopting a generative approach to producing visual examples to guide a user via adversarial perturbation, there is virtually no need to limit suggestions to those visuals existing within an indexed dataset.

Example Flow Diagrams

Figure 8:
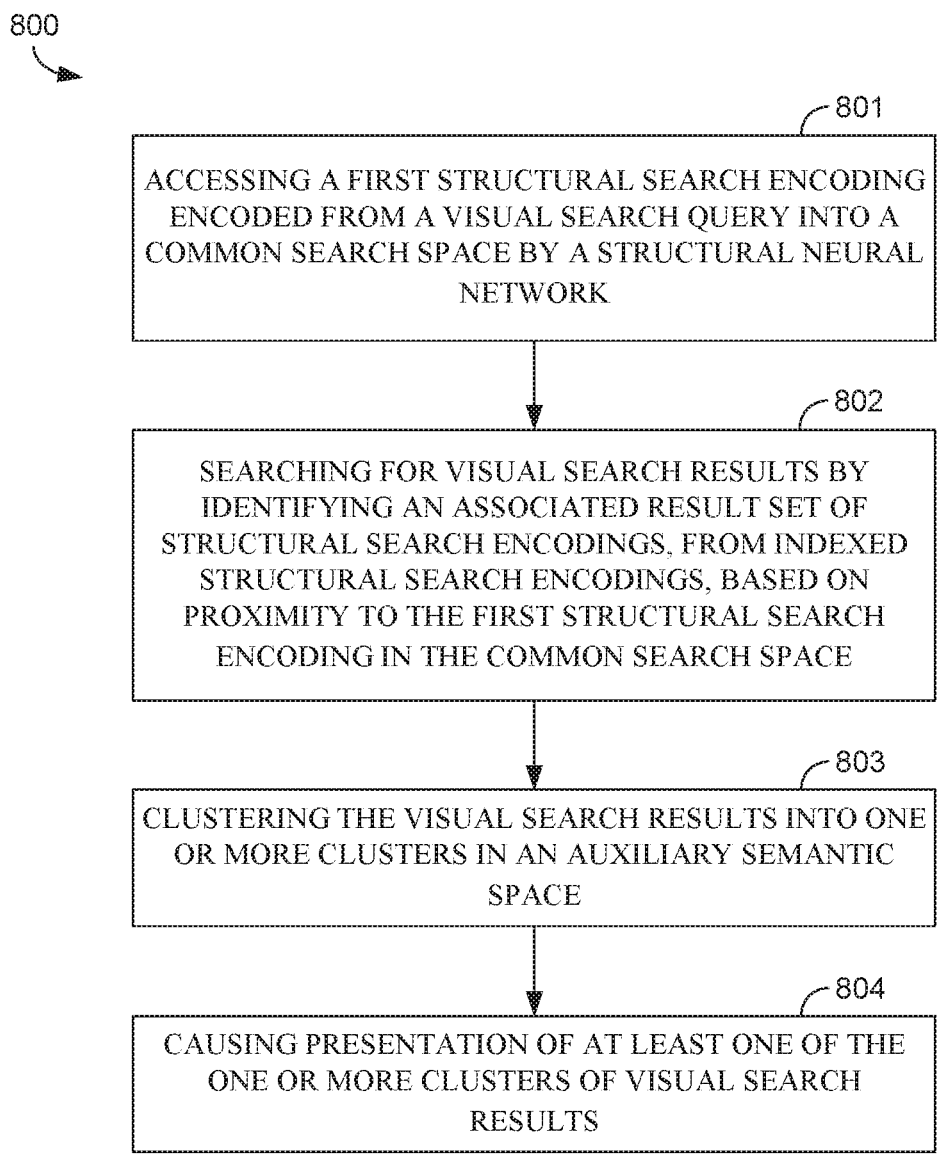
FIG. 8 is a flow diagram showing a method for generating clusters of visual search results, in accordance with embodiments of the present invention.
Figure 9:
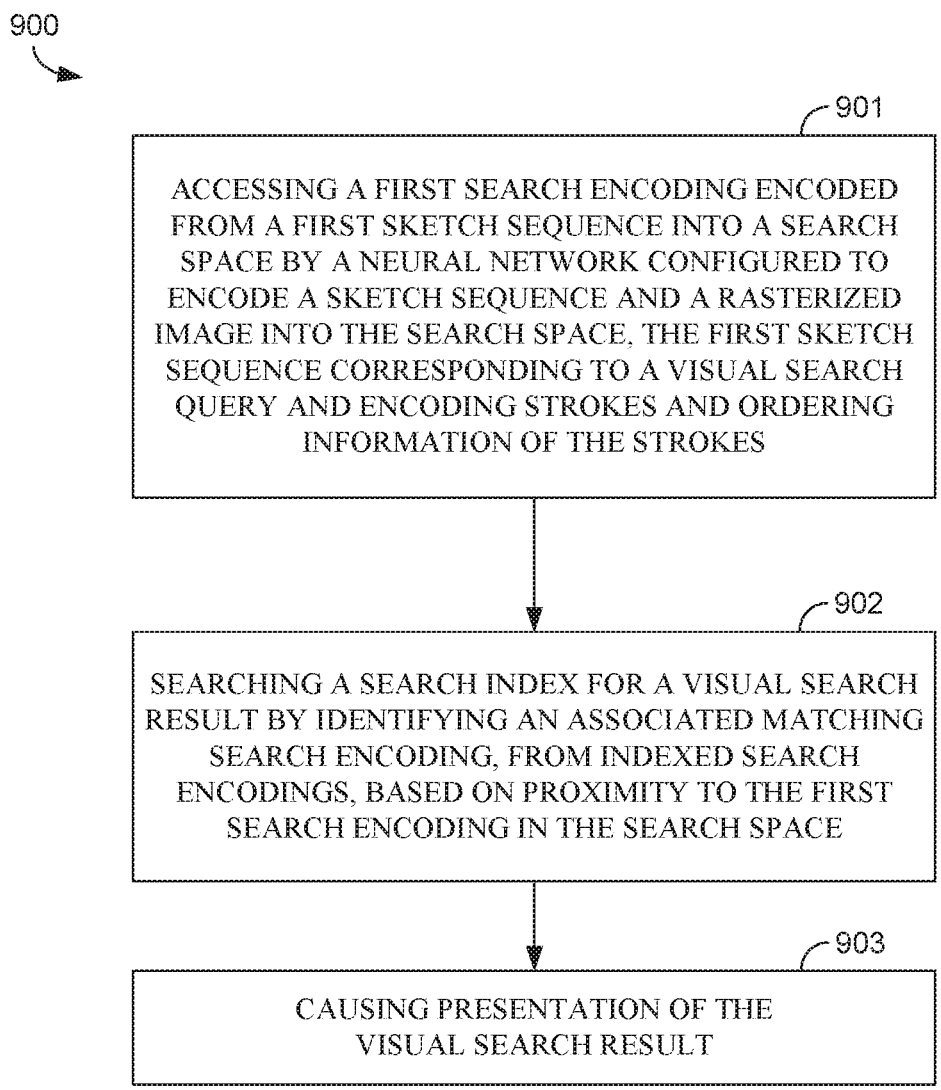
FIG. 9 is a flow diagram showing a method for generating a visual search result for a visual search query in the form of a sketch sequence, in accordance with embodiments of the present invention.

With reference now to FIGS. 8-9, flow diagrams are provided illustrating methods for guided visual search. Each block of the methods 800 and 900 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 8, FIG. 8 illustrates a method 800 for generating clusters of visual search results, in accordance with embodiments described herein. Initially at block 801, a first structural search encoding encoded from a visual search query into a common search space by a structural neural network is accessed. At block 802, a search is performed for visual search results by identifying an associated result set of structural search encodings, from indexed structural search encodings, based on proximity to the first structural search encoding in the common search space. At block 803, the visual search results are clustered into one or more clusters in an auxiliary semantic space. At block 804, a presentation of at least one of the one or more clusters of visual search results is caused.

Turning now to FIG. 9, FIG. 9 illustrates a method 900 for generating a visual search result for a visual search query in the form of a sketch sequence, in accordance with embodiments described herein. Initially, at block 901, a first search encoding is accessed. The first search encoding is encoded from a first sketch sequence into a search space by a neural network configured to encode a sketch sequence and a rasterized image into the search space. The first sketch sequence corresponds to a visual search query and encodes strokes and ordering information of the strokes. At block 902, a search index is searched for a visual search result by identifying an associated matching search encoding, from indexed search encodings, based on proximity to the first search encoding in the search space. At block 903, a presentation of the visual search result is caused.

Example Computing Environment

Figure 10:
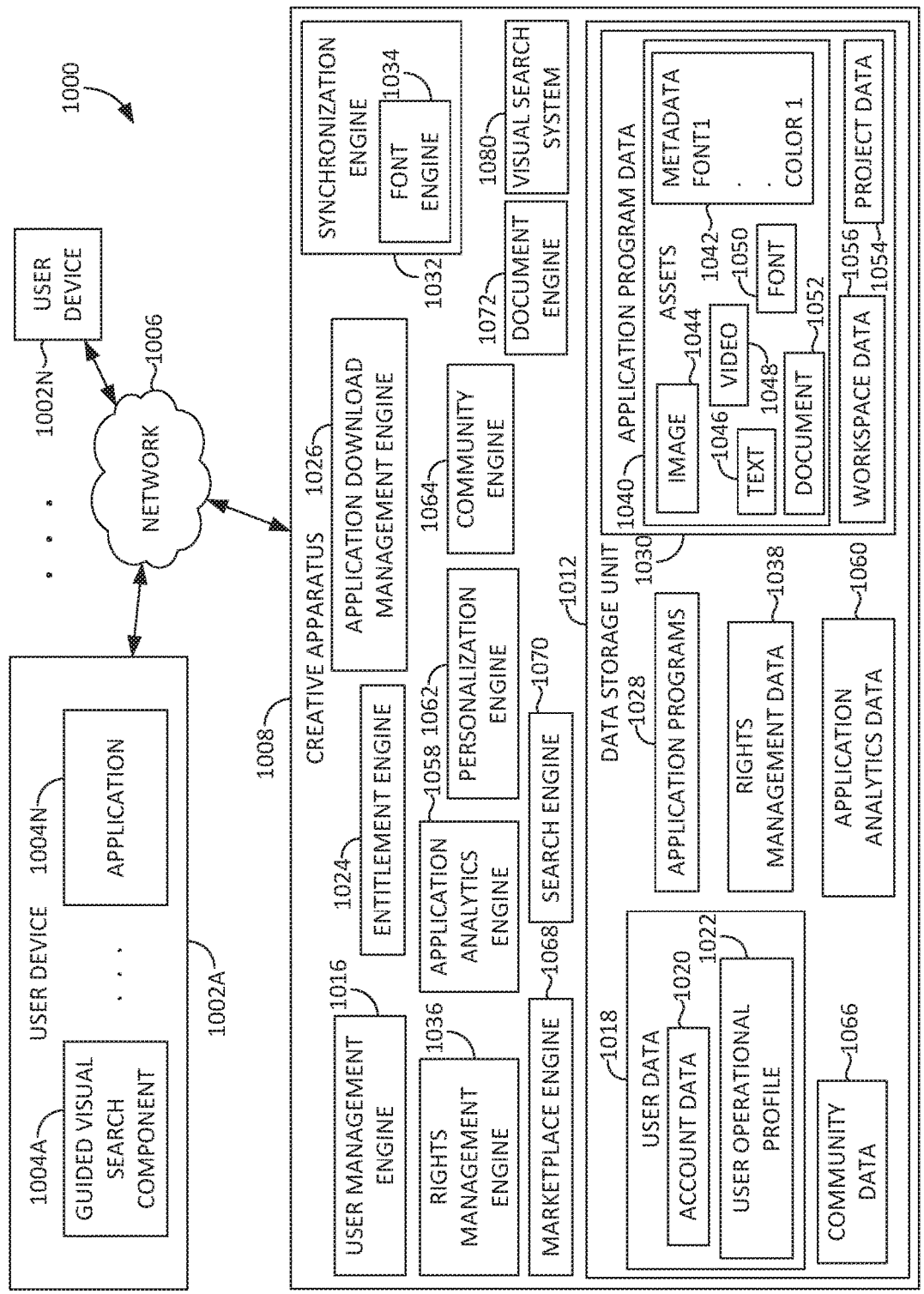
FIG. 10 is a block diagram of an exemplary computing environment in which embodiments of the invention may be employed.

FIG. 10 is a diagram of environment 1000 in which one or more embodiments of the present disclosure can be practiced. Environment 1000 includes one or more user devices, such as user devices 1002A-1002N. Examples of user devices include, but are not limited to, a personal computer (PC), tablet computer, a desktop computer, cellular telephone, a processing unit, any combination of these devices, or any other suitable device having one or more processors. Each user device includes at least one application supported by creative apparatus 1008. It is to be appreciated that following description may generally refer to user device 1002A as an example and any other user device can be used.

A user of the user device can utilize various products, applications, or services supported by creative apparatus 1008 via network 1006. User devices 1002A-1002N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manage digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes creative apparatus 1008.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 1002A-1002N can be connected to creative apparatus 1008 via network 1006. Examples of network 1006 include, but are not limited to, internet, local area network (LAN), wireless area network, wired area network, wide area network, and the like.

Creative apparatus 1008 includes one or more engines for providing one or more digital experiences to the user. Creative apparatus 1008 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. Creative apparatus 1008 also includes data storage unit 1012. Data storage unit 1012 can be implemented as one or more databases or one or more data servers. Data storage unit 1012 includes data that is used by the engines of creative apparatus 1008.

A user of user device 1002A visits a webpage or an application store to explore applications supported by creative apparatus 1008. Creative apparatus 1008 provides the applications as a software as a service (SaaS), or as a standalone application that can be installed on user device 1002A, or as a combination. The user can create an account with creative apparatus 1008 by providing user details and also by creating login details. Alternatively, creative apparatus 1008 can automatically create login details for the user in response to receipt of the user details. In some embodiments, the user is also prompted to install an application manager. The application manager enables the user to manage installation of various applications supported by creative apparatus 1008 and also to manage other functionalities, such as updates, subscription account and the like, associated with the applications. User details are received by user management engine 1016 and stored as user data 1018 in data storage unit 1012. In some embodiments, user data 1018 further includes account data 1020 under which the user details are stored.

The user can either opt for a trial account or can make payment based on type of account or subscription chosen by the user. Alternatively, the payment can be based on product or number of products chosen by the user. Based on payment details of the user, user operational profile 1022 is generated by entitlement engine 1024. User operational profile 1022 is stored in data storage unit 1012 and indicates entitlement of the user to various products or services. User operational profile 1022 also indicates type of user, i.e. free, trial, student, discounted, or paid.

In some embodiment, user management engine 1016 and entitlement engine 1024 can be one single engine performing the functionalities of both the engines.

The user can then install various applications supported by creative apparatus 1008 via an application download management engine 1026. Application installers or application programs 1028 present in data storage unit 1012 are fetched by application download management engine 1026 and made available to the user directly or via the application manager. In one embodiment, an indication of all application programs 1028 are fetched and provided to the user via an interface of the application manager. In another embodiment, an indication of application programs 1028 for which the user is eligible based on user's operational profile are displayed to the user. The user then selects application programs 1028 or the applications that the user wants to download. Application programs 1028 are then downloaded on user device 1002A by the application manager via the application download management engine 1026. Corresponding data regarding the download is also updated in user operational profile 1022. Application program 1028 is an example of the digital tool. Application download management engine 1026 also manages the process of providing updates to user device 1002A.

Upon download, installation and launching of an application program, in one embodiment, the user is asked to provide the login details. A check is again made by user management engine 1016 and entitlement engine 1024 to ensure that the user is entitled to use the application program. In another embodiment, direct access is provided to the application program as the user is already logged into the application manager.

The user uses one or more application programs 1004A-1004N installed on the user device to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects, and/or the assets can be stored as application program data 1030 in data storage unit 1012 by synchronization engine 1032. Alternatively or additionally, such data can be stored at the user device, such as user device 1002A.

Application program data 1030 includes one or more assets 1040. Assets 1040 can be a shared asset which the user wants to share with other users or which the user wants to offer on a marketplace. Assets 1040 can also be shared across multiple application programs 1028. Each asset includes metadata 1042. Examples of metadata 1042 include, but are not limited to, font, color, size, shape, coordinate, a combination of any of these, and the like. In addition, in one embodiment, each asset also includes a file. Examples of the file include, but are not limited to, image 1044, text 1046, video 1048, font 1050, document 1052, a combination of any of these, and the like. In another embodiment, an asset only includes metadata 1042.

Application program data 1030 also include project data 1054 and workspace data 1056. In one embodiment, project data 1054 includes assets 1040. In another embodiment, assets 1040 are standalone assets. Similarly, workspace data 1056 can be part of project data 1054 in one embodiment while it may be standalone data in other embodiment.

A user can operate one or more user device to access data. In this regard, application program data 1030 is accessible by a user from any device, including a device which was not used to create assets 1040. This is achieved by synchronization engine 1032 that stores application program data 1030 in data storage unit 1012 and enables application program data 1030 to be available for access by the user or other users via any device. Before accessing application program data 1030 by the user from any other device or by any other user, the user or the other user may need to provide login details for authentication if not already logged in. In some cases, if the user or the other user are logged in, then a newly created asset or updates to application program data 1030 are provided in real time. Rights management engine 1036 is also called to determine whether the newly created asset or the updates can be provided to the other user or not. Workspace data 1056 enables synchronization engine 1032 to provide a same workspace configuration to the user on any other device or to the other user based on rights management data 1038.

In various embodiments, various types of synchronization can be achieved. For example, the user can pick a font or a color from user device 1002A using a first application program and can use the font or the color in a second application program on any other device. If the user shares the font or the color with other users, then the other users can also use the font or the color. Such synchronization generally happens in real time. Similarly, synchronization of any type of application program data 1030 can be performed.

In some embodiments, user interaction with applications 1004 is tracked by application analytics engine 1058 and stored as application analytics data 1060. Application analytics data 1060 includes, for example, usage of a tool, usage of a feature, usage of a workflow, usage of assets 1040, and the like. Application analytics data 1060 can include the usage data on a per user basis and can also include the usage data on a per tool basis or per feature basis or per workflow basis or any other basis. Application analytics engine 1058 embeds a piece of code in applications 1004 that enables the application to collect the usage data and send it to application analytics engine 1058. Application analytics engine 1058 stores the usage data as application analytics data 1060 and processes application analytics data 560 to draw meaningful output. For example, application analytics engine 1058 can draw an output that the user uses "Tool 4" a maximum number of times. The output of application analytics engine 1058 is used by personalization engine 1062 to personalize a tool menu for the user to show "Tool 4" on top. Other types of personalization can also be performed based on application analytics data 1060. In addition, personalization engine 1062 can also use workspace data 1056 or user data 1018 including user preferences to personalize one or more application programs 1028 for the user.

In some embodiments, application analytics data 1060 includes data indicating status of a project of the user. For example, if the user was preparing an article in a digital publishing application and what was left was publishing the prepared article at the time the user quit the digital publishing application, then application analytics engine 1058 tracks the state. Now when the user next opens the digital publishing application on another device, then the user is indicated and the state and options are provided to the user for publishing using the digital publishing application or any other application. In addition, while preparing the article, a recommendation can also be made by synchronization engine 1032 to incorporate some of other assets saved by the user and relevant for the article. Such a recommendation can be generated using one or more engines, as described herein.

Creative apparatus 1008 also includes community engine 1064 which enables creation of various communities and collaboration among the communities. A community, as described herein, includes a group of users that share at least one common interest. The community can be closed, i.e., limited to a number of users or can be open, i.e., anyone can participate. The community enables the users to share each other's work and comment or like each other's work. The work includes application program data 1030. Community engine 1064 stores any data corresponding to the community, such as work shared on the community and comments or likes received for the work as community data 1066. Community data 1066 also includes notification data and is used for notifying other users by the community engine in case of any activity related to the work or new work being shared. Community engine 1064 works in conjunction with synchronization engine 1032 to provide collaborative workflows to the user. For example, the user can create an image and can request for some expert opinion or expert editing. An expert user can then either edit the image as per the user liking or can provide expert opinion. The editing and providing of the expert opinion by the expert is enabled using community engine 1064 and synchronization engine 1032. In collaborative workflows, a plurality of users is assigned different tasks related to the work.

Creative apparatus 1008 also includes marketplace engine 1068 for providing marketplace to one or more users. Marketplace engine 1068 enables the user to offer an asset for selling or using. Marketplace engine 1068 has access to assets 1040 that the user wants to offer on the marketplace. Creative apparatus 1008 also includes search engine 1070 to enable searching of assets 1040 in the marketplace. Search engine 1070 is also a part of one or more application programs 1028 to enable the user to perform search for assets 1040 or any other type of application program data 1030. Search engine 1070 can perform a search for an asset using metadata 1042 or the file.

Creative apparatus 1008 also includes document engine 1072 for providing various document related workflows, including electronic or digital signature workflows, to the user. Document engine 1072 can store documents as assets 1040 in data storage unit 1012 or can maintain a separate document repository (not shown in FIG. 10).

In accordance with embodiments of the present invention, application programs 1028 include a guided visual search component that facilitates incremental query modifications for a visual search query. In these embodiments, the guided visual search component is provided as an application to user device 1002A (e.g., as guided visual search component 1004A) such that the application operates via the user device. In another embodiment, the guided visual search component is provided as an add-on or plug-in to an application such as application 1004N. These configurations are merely exemplary, and other variations for providing storyboarding software functionality are contemplated within the present disclosure.

It is to be appreciated that the engines and working of the engines are described as examples herein, and the engines can be used for performing any step in providing digital experience to the user.

Example Operating Environment

Figure 11:
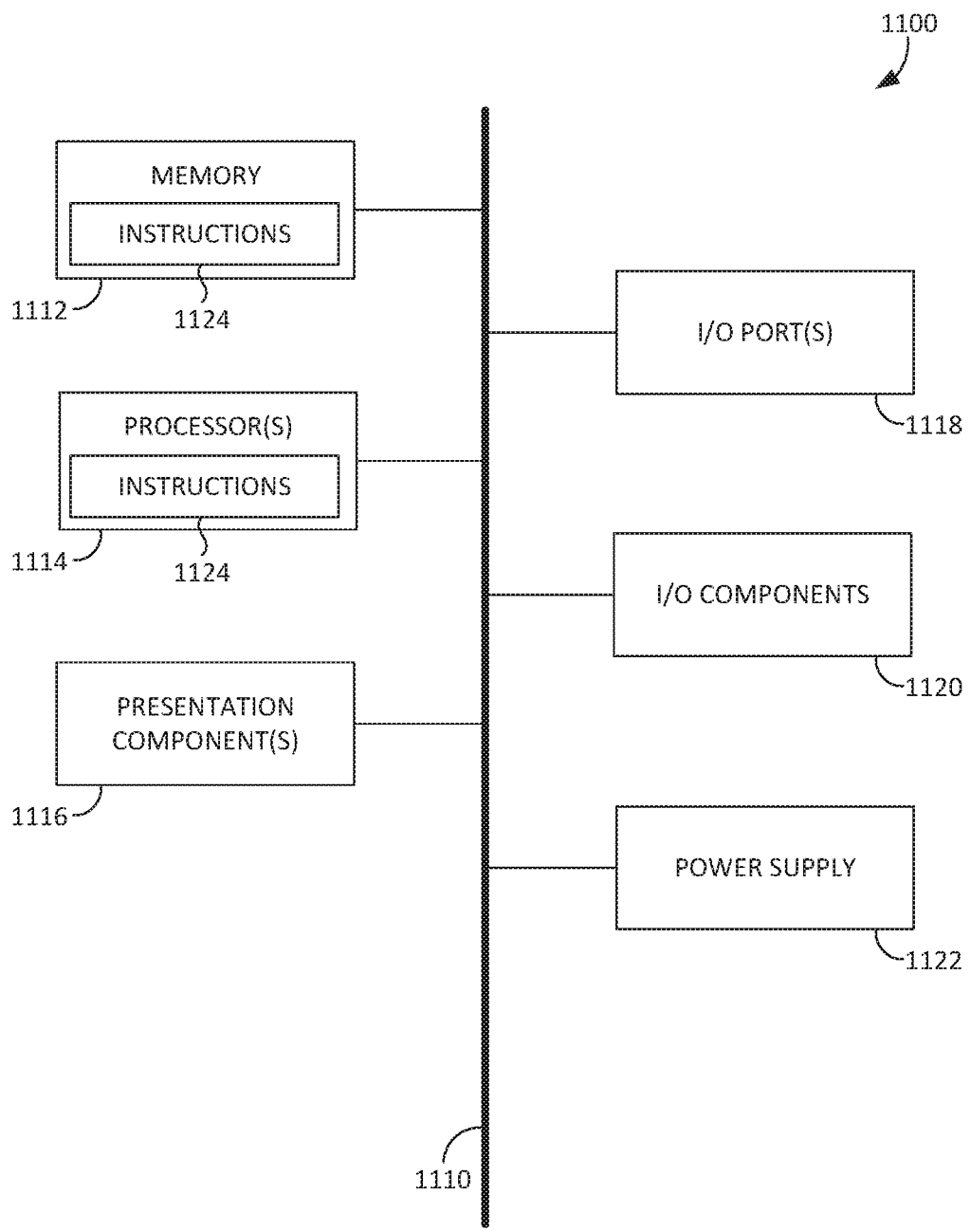
FIG. 11 is a block diagram of an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, touch pad, touch screen, etc. The I/O components 1120 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 1100. Computing device 1100 may be equipped with depth cameras, such as stereoscopic camera systems, infrared camera systems, RGB camera systems, touchscreen technology, and combinations of these, for gesture detection and recognition. Additionally, the computing device 1100 may be equipped with accelerometers or gyroscopes that enable detection of motion. The output of the accelerometers or gyroscopes may be provided to the display of computing device 1100 to render immersive augmented reality or virtual reality.

Embodiments described herein support guided visual search. The components described herein refer to integrated components of a guided visual search system. The integrated components refer to the hardware architecture and software framework that support functionality using the guided visual search system. The hardware architecture refers to physical components and interrelationships thereof and the software framework refers to software providing functionality that can be implemented with hardware embodied on a device.

The end-to-end software-based system can operate within system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for the system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   accessing a first structural search encoding encoded from a visual search query into a common search space by a structural neural network;
   searching for visual search results based on structural similarity by identifying an associated result set of structural search encodings, from indexed structural search encodings, based on proximity to the first structural search encoding in the common search space;
   clustering the visual search results of the visual search query, based on semantic meaning, into one or more clusters in an auxiliary semantic space, distinct from the common search space;
   causing presentation of at least one cluster of the one or more clusters of visual search results and a sketch suggestion associated with the at least one cluster;
   receiving an input indicating a transformation from the visual search query to the sketch suggestion; and
   generating the transformation by (i) interpreting the input as designating a location in the common search space, (ii) generating an adversarial encoding by backpropagating a corresponding loss in the structural neural network; and (iii) generating an adversarial image from the adversarial encoding.

2. The one or more computer storage media of claim 1, the operations further comprising:
   encoding a plurality of images into the indexed structural search encodings in the common search space using the structural neural network; and
   encoding the plurality of images into indexed semantic search encodings in the auxiliary semantic space using a semantic neural network, wherein clustering the visual search results in the auxiliary semantic space comprises:
      identifying a corresponding result set of semantic search encodings, from the indexed semantic search encodings in the auxiliary semantic space, associated with the result set of structural search encodings in the common search space; and
      clustering the result set of semantic search encodings in the auxiliary semantic space.

3. The one or more computer storage media of claim 1, the operations further comprising identifying a top cluster of visual search results of the one or more clusters based on proximity, in the common search space, between the visual search query and an indexed sketch associated with the top cluster.

4. The one or more computer storage media of claim 3, the operations further comprising causing a presentation of the indexed sketch, as the sketch suggestion, in association with the top cluster of visual search results.

5. The one or more computer storage media of claim 1, wherein the operations are part of a guided visual search comprising incremental query modifications to the visual search query and corresponding updated visual search results.

6. The one or more computer storage media of claim 1, the operations further comprising:
   receiving a selection of the sketch suggestion as a target sketch; and
   automatically transforming the visual search query to the target sketch.

7. A computerized method for performing a visual search, the method comprising:
   encoding a plurality of images into indexed search encodings in a search space using a neural network configured to encode a sketch sequence and a rasterized image into the search space;
   saving the indexed search encodings in a search index;
   accessing a first search encoding encoded from a first sketch sequence into the search space by the neural network, the first sketch sequence corresponding to a visual search query and encoding strokes and input order of the strokes;
   searching the search index for a visual search result by identifying an associated matching search encoding, from the indexed search encodings, based on proximity to the first search encoding in the search space; and
   causing presentation of the visual search result.

8. The computerized method of claim 7, wherein the visual search result is one of a plurality of visual search results, wherein the search space is a structural search space, the method further comprising:
   clustering the visual search results into clusters in an auxiliary semantic space, wherein a first cluster of the clusters includes the visual search result; and
   causing presentation of the first cluster of visual search results.

9. The computerized method of claim 7, wherein the visual search result is one of a plurality of visual search results, the method further comprising identifying a sketch suggestion, associated with a first cluster of the visual search results, from a plurality of indexed sketches, by:
- identifying a set of the visual search results in the first cluster;
- identifying, for each visual search result in the set, an associated sketch of the indexed sketches based on proximity to the visual search result in the search space; and
- identifying the sketch suggestion as a nearest sketch of the associated sketches based on proximity to the visual search query in the search space.

10. The computerized method of claim 7, wherein the method is part of a guided visual search comprising incremental query modifications to the visual search query and corresponding updated visual search results.

11. The computerized method of claim 7, further comprising causing presentation of a sketch suggestion associated with the visual search result;
- receiving a selection of the sketch suggestion as a target sketch; and
- automatically transforming the visual search query to the target sketch.

12. The computerized method of claim 7, further comprising:
- causing presentation of a sketch suggestion associated with the visual search result;
- receiving an input indicating a transformation from the visual search query to the sketch suggestion; and
- generating the transformation by:
  - interpreting the input as designating a location in the search space;
  - generating an adversarial encoding by backpropagating a corresponding loss in the neural network; and
  - generating an adversarial image from the adversarial encoding.

13. A visual search system comprising:
- one or more hardware processors and memory configured to provide computer program instructions to the one or more hardware processors;
- a visual search query encoder configured to use the one or more hardware processors to encode a visual search query into a first search encoding in a common search space using a neural network;
- a search component configured to use the one or more hardware processors to search for visual search results, from a first plurality of indexed search encodings corresponding to images in the common search space, based on proximity to the first search encoding in the common search space;
- a means for identifying a sketch suggestion associated with the visual search results, from a second plurality of indexed search encodings corresponding to a plurality of indexed sketches, distinct from the images, in the common search space, by (i) identifying a set of the visual search results in a first cluster, (ii) identifying, for each visual search result in the set, an associated sketch of the indexed sketches based on proximity to the visual search result in the common search space, and (iii) identifying the sketch suggestion as a nearest sketch of the associated sketches based on proximity to the first search encoding of the visual search query in the common search space; and
- a visualization component configured to use the one or more hardware processors to cause presentation of the sketch suggestion in association with the visual search results.

14. The visual search system of claim 13, wherein the visual search system is configured to accept incremental query modifications to the visual search query and generate corresponding updated visual search results.

15. The visual search system of claim 13, wherein the visualization component is configured to:
- cause presentation of the sketch suggestion associated with the visual search results;
- receive a selection of the sketch suggestion as a target sketch; and
- automatically transform the visual search query to the target sketch.

16. The visual search system of claim 13, further comprising an adversarial perturbation component configured to use the one or more hardware processors to:
- receive an input indicating a transformation from the visual search query to the sketch suggestion; and
- generate the transformation by:
  - interpreting the input as designating a location in the common search space;
  - generating an adversarial encoding by backpropagating a corresponding loss in the neural network; and
  - generating an adversarial image from the adversarial encoding.

17. The visual search system of claim 16, wherein the adversarial encoding is an RNN encoding, and wherein an RNN decoder associated with the neural network is configured to generate the adversarial image from the RNN encoding.

* * * * *